United States Patent Office 3,269,906
Patented August 30, 1966

3,269,906
3-IMINO-3,4-DIHYDRO-1,2,4-BENZOTHIADIAZINE-1,1-DIOXIDES
John Gordon Topliss, East Orange, and Nathan Sperber, North Caldwell, N.J., assignors to Schering Corporation, Bloomfield, N.J., a corporation of New Jersey
No Drawing. Filed Feb. 21, 1961, Ser. No. 90,631
12 Claims. (Cl. 167—65)

This invention relates to novel pharmaceutical preparations in which the active ingredient is a novel 3-imino - 3,4 - dihydro-1,2,4-benzothiadiazine-1,1-dioxide, and the non-toxic alkali metal salts thereof, and to their use in the methods for treating hypertension in mammals, including domestic mammals, such as dogs, etc.

From laboratory tests, it is to be found that our compounds will lower blood pressure in both normotensive and hypertensive mammals, the latter action being slow in its onset and of long duration. Likewise, our compositions will also antagonize blood pressure responses to such well known pressor agents as epinephrine, norepinephrine and angiotensin.

This antagonism, it should be noted, functions without any particular specificity, but rather, the effect is general to the class of compounds functioning as pressor agents. A further property exhibited by our compositions is that they will significantly increase peripheral and coronary blood flow.

In essence, the anti-hypertensive action of our compositions does not depend upon diuresis, ganglionic blockage, or adrenergic blockage, but rather, our compositions directly affect that part of the vascular system which is deranged in hypertension, i.e.—the peripheral vasculature. Hence, our compositions are what may be termed as "true" anti-hypertensives, and as such, are capable of service as valuable therapeutic agents useful for the alleviation and control of such diseases as malignant hypertension, essential hypertension, and the like, and for peripheral vascular disorders (e.g.—Buerger's disease, Raynaud's disease, etc.), angina pectoris, and the like.

The active ingredients of our novel compositions are 3-imino-3,4-dihydro-1,2,4-benzothiadiazine-1,1 - dioxides having the below depicted structural formulae, and the non-toxic alkali metal salts thereof. In those compounds having no substituent other than hydrogen on the nitrogen atoms in the benzothiadiazine-1,1-dioxide nucleus the molecules may exit in three tautomeric forms (A), (B) and (C) as depicted. For the sake of convenience they will hereafter be described as the form (A) although the inventors consider all three tautomeric forms within the scope of their invention. In those compounds wherein the substituent R is other than hydrogen the molecules may exist in the tautomeric forms (A') and (C'). For the sake of convenience these will hereafter be described in the form (A') although the inventors consider both possible tautomeric forms within the scope of their invention.

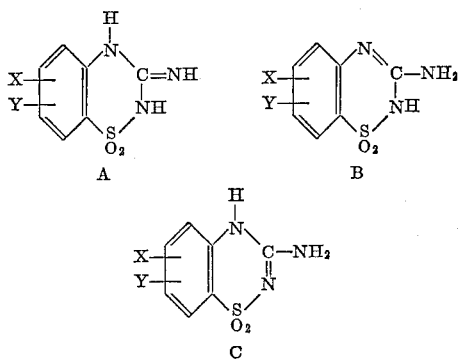

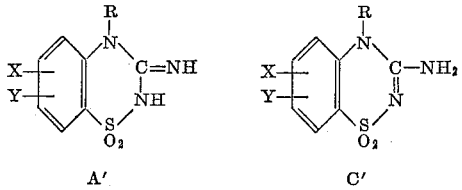

In the above depicted structural formulae X is representative of hydrogen, trifluoromethyl, halogen, preferably chlorine and bromine, or a lower alkyl having 1 to 5 carbon atoms, preferably methyl and ethyl and including the straight and branched chain propyl, butyl and pentyl; and R is lower alkyl; and Y represents trifluoromethyl, and halogen.

Compounds of the type A' wherein R is equal to a lower alkyl are prepared by treating a compound of type A with the requisite alkyl halide or alkyl sulfate (which may be in equivalent quantity or excess) in the presence of one equivalent quantity or excess of a base such as an alkali metal alkoxide. The reaction conditions employed are typical of those conventionally employed for alkylations of this type. For instance in the preparation of a compound wherein R is equal to methyl the 3-imino-3,4-dihydro-1,2,4-benzothiadiazine - 1,1 - dioxide is refluxed with a methanolic solution of an equivalent of sodium methoxide and an excess of methyl iodide for several hours. The alkylated product is then isolated by standard procedures.

Illustrative of a few of the compounds embraced by the above depicted structural formulae are: 6-chloro-3-imino-3,4-dihydro-1,2,4-benzothiadiazine-1,1 - dioxide; 7-chloro - 3 - imino-3,4-dihydro - 1,2,4 - benzothiadiazine-1,1-dioxide; 6,7-dichloro-3-imino - 3,4 - dihydro - 1,2,4-benzothiadiazine-1,1-dioxide; 4-methyl-6-trifluoromethyl-3-imino-3,4-dihydro-1,2,4-benzothiadiazine-1,1 - dioxide; 7-trifluoromethyl - 3 - imino - 3,4-dihydro-1,2,4 - benzothiadiazine - 1,1 - dioxide; 6-chloro-7-trifluoromethyl-3-imino-3,4-dihydro-1,2,4-benzothiadiazine-1,1 - dioxide; 6-methyl-7-bromo-3-imino-3,4-dihydro-1,2,4 - benzothiadiazine-1,1-dioxide; 6,7-di-trifluoromethyl-3-imino-3,4-dihydro-1,2,4-benzothiadiazine-1,1-dioxide.

As is true in any class of compositions suitable for therapeutic administration, a few are recognized as having superior pharmacological effectiveness. In general, of those active ingredient compounds which are mono-substituted in the benzenoid portion of the benzothiadiazine nucleus, it is preferred to have said substituent located at either the 6- or 7-positions; and of the compounds which are di-substituted in the said benzenoid moiety, it is preferred to have the substituents located at the 6- and 7-; 6, and 8-, or the 7- and 8-positions.

Illustrative of some of the preferred active ingredient compounds of these compositions are: 6,7-dichloro-3-imino - 3,4 - dihydro - 1,2,4 - benzothiadiazine - 1, 1- dioxide; 6 - trifluoromethyl - 3 - imino - 3,4 - dihydro - 1,2,4-benzothiadiazine - 1,1 - dioxide; 6 - chloro - 7 - methyl - 3 - imino - 3,4 - dihydro - 1,2,4 - benzothiadiazine - 1,1 - dioxide; 6 - methyl - 7 - chloro - 3 - imino - 3,4 - dihydro - 1,2,4 - benzothiadiazine - 1,1 - dioxide; 6 - trifluoromethyl - 7 - chloro - 3 - imino - 3,4 - dihydro - 1,2,4 - benzothiadiazine-1,1-dioxide.

The effective dosage of the compositions of this invention depends upon the severity, the stage, and the individual characteristics of each case. Generally, a dosage range of from 0.1 to about 50 mg./kg. of body weight per day would constitute the overall range, with a range of about 0.1–5 mg./kg. per day for the preferred compositions.

The compositions of our invention may be used in the form of pharmaceutical preparations which contain the active ingredient in admixture with a pharmaceutical carrier suitable for enteral or parenteral administration. Such preparations may be in solid forms, as for example, tablets and capsules, or in liquid forms, as for example, elexirs, emulsions and injectables.

In the formulation of pharmaceutical preparations there can be employed such substances which do not react with the active substances, as for example, water, gelatine, lactose, starches, magnesium stearate, calcium carbonate, talc, vegetable oils, benzyl alcohols, gums, polyalkylene glycols, and petroleum jelly. The active ingredient is preferably present in the preparation in such proportions by weight that the proportion by weight of active ingredient in the formation to be administered lies between 0.1% and 50%.

In addition to the above enumerated excipients which are incorporated into the compositions of this invention, in some instances (here again, depending upon the individual characteristics of the host, the severity of the malady being treated, potency of active ingredient, etc.) an additional active ingredient may be indicated. For example, in some instances, it may be advantageous to incorporate into the compositions of this invention a therapeutically effective quantity of a diuretic.

Satisfactory formulations are shown in the following examples which are presented for illustration only. Variant dosage forms as well as varying formulations may be prepared according to analogous procedures. The preparations may be administered once to several times per day depending upon the conditions and the response evoked.

*Example 1—Tablet formulation*

The following formulation provides for the manufacture of 1000 tablets, each containing 25 mg. of active ingredient:

|  | G. |
|---|---|
| (1) 7 - chloro - 3 - imino - 3,4 - dihydro - 1,2,4-benzothiadiazine-1,1-dioxide | 25.0 |
| (2) Lactose, U.S.P. | 181.0 |
| (3) Corn starch, U.S.P. | 92.5 |
| (4) Magnesium stearate | 1.5 |

A mixture of 72.5 g. of corn starch and the lactose is thoroughly granulated with a paste prepared by dissolving 20 gm. of corn sarch in 100 ml. of hot distilled water. The resulting granulation is dried at 40–45° C. and passed thru a No. 16 mesh screen. To the dried, screened granulation is added a blended mixture of the active ingredient (1) and the magnesium stearate. The resulting mixture is thoroughly blended and then pressed into tablets of 300 mg. each.

*Example 2.—Capsule formulation*

The following formulation provides for the manufacture of 1000 capsules, each containing 25 mg. of active ingredient:

|  | G. |
|---|---|
| (1) 7 - chloro - 3 - imino - 3,4 - dihydro - 1,2,4-benzothiadiazine-1,1-dioxide | 25.0 |
| (2) Lactose | 273.5 |
| (3) Magnesium stearate | 1.5 |

The active ingredient (1) is mixed with the lactose and blended. The magnesium stearate is mixed into this blend and the resulting mixture is thoroughly blended. Hard gelatine capsules are each filled with 300 mg. of the blended mixture whereby there are obtained capsules containing 25 mg. of 7-chloro-3-imino-3,4-dihydro-1,2,4-benzothiadiazine-1,1-dioxide.

*Example 3*

The following formulation provides for the manufacture of 1000 vials each containing 10 mg. of active ingredient:

|  |  |
|---|---|
| (1) 7 - chloro - 3 - imino - 3,4 - dihydro - 1,2,4-benzothiadiazine-1,1-dioxide sodium salt, gm. | 10.95 |
| (2) Monobasic potassium phosphate, gm. | 6.0 |
| (3) Exsiccated sodium phosphate, gm. | 12.0 |
| (4) Water for injection, U.S.P., q.s., liter | 1.0 |

Ingredients (1), (2), and (3) are dissolved in approximately 80% of the volume of water and the resulting solution is filtered. To the resulting filtrate is added sufficient water to make a 1000 ml. volume. The solution is sterile filtered, and one milliliter portions of the so-prepared solution are aseptically filled into 2 ml. vials, and then lyophylized. After the lyophylized cake is dry, the vials are aseptically stoppered with rubber plugs and sealed.

There is also embraced within the scope of this invention such novel compounds as are depicted and defined above. (Again it should be noted that although these novel compounds are defined in their 3-imino form, the other tautomeric forms are also embraced.)

The novel 3-imino-3,4-dihydro-1,2,4-benzothiadiazine-1,1-dioxides of this invention can be prepared by heating a mixture of a selected o-sulfamylaniline compound and guanidine, preferably as the carbonate salt thereof at a temperature of between about 175–225° C. It is preferred to employ the reactants in the ratio of about 1 part of the selected o-sulfamylaniline compound to two parts of the guanidine reagent, although in excess of two equivalents of the guanidine reagent can be employed without harmful effects. Heating of the reactants is continued until the mixture liquifies at which time ammonia gas is given off and thereafter the mixture usually resolidifies. The so-produced 3-imino-3,4-dihydro-1,2,4-benzothiadiazine-1,1-dioxide is then dissolved in a suitable solvent (e.g. water), filtered and the product precipitated by the addition of acid. Purification advantageously is effected by crystallization from either water or aqueous alcohol.

In general, the above mentioned o-sulfamylaniline starting materials are compounds having the structural formula:

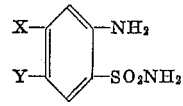

said X and Y radicals being as defined above.

Certain of these o-sulfamylaniline compounds may be prepared by chlorosulfonating the appropriate aniline compounds in the presence of an alkali metal halide to form the corresponding o-chlorosulfonyl halide according to procedures well-known to those skilled in the art. These compounds are then treated with ammonia to form the desired starting compound. In instances wherein the specific X- and Y-substituted aniline compounds are not known, they may readily be prepared by procedures analogous to those utilized for the known anilines.

Another, and more general method for preparing the above depicted o-sulfamylaniline starting compounds is by treating an appropriately X- and Y-substituted o-nitrochlorobenzene (I) with a mixture containing thiourea, benzyl chloride and an alkali to yield a benzylthio compound (II) which compound is then successively treated with (a) chlorine in aqueous acetic acid, and then (b) ammonia, to yield the appropriate nitrosulfonamide (III). The nitrosulfonamide is reduced with iron in an ammonium chloride solution to yield the desired substituted o-sulfamylaniline. This series of reactions may be illustrated as follows:

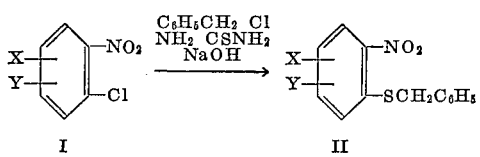

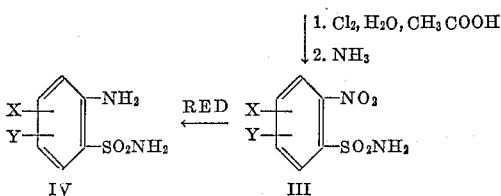

In general, if a particular o-nitrochlorobenzene (I) is not known, it may be prepared by any of the usually well-known procedures.

The alkali metal salts of the benzothiadiazine-1,1-dioxide compounds of this invention can be prepared by dissolving the selected compound in an equimolar aqueous or alcoholic solution of the alkali metal hydroxide, and, if desired, isolating the salt by evaporating the solvent. Any of the conventional alkali metal salts, such as sodium, potassium, lithium or the like can be prepared by this method or by other methods known to those skilled in the art.

The following examples will serve to further exemplify and illustrate the nature of these various reactions, and to further demonstrate the scope of the various groups which may be present in a particular position. These examples, however, are not intended and should not be construed in any way so as to limit the scope of the present invention, as the scope is delineated by the appended claims.

EXAMPLE 4.—*6-chloro-3-imino-3,4-dihydro-1,2,4-benzothiadiazine-1,1-dioxide*

(A) *2-benzylthio-5-chloro-nitrobenzene.*—Reflux a mixture containing 63 g. of benzyl chloride, 38 g. of thiourea and 3 drops of concentrated ammonium hydroxide solution in 250 ml. of 95% ethanol for 3 hours. Add to this refluxed mixture a solution containing 96 g. of 2,5-dichloronitrobenzene in 200 ml. of ethanol, and bring the resulting mixture to reflux temperature. Add a solution of 70 g. of potassium hydroxide in 500 ml. of ethanol to the reflux mixture (in a dropwise fashion) and reflux the resulting reaction mixture for 2 hours, cool and filter. Wash the filtered product, 2-benzylthio-5-chloro-nitrobenzene, with aqueous ethanol and dry it to obtain the intermediate of the example.

(B) *2-nitro - 4 - chloro-benzenesulfonamide.*—Bubble chlorine gas thru a suspension containing 50 g. of 2-benzylthio-5-chloro-nitrobenzene in 1000 ml. of 33% aqueous acetic acid (maintained at a temperature range of about 0°–5° C.) for 2 hours, to yield a colored, oil-like substance. Extract the oil-like substance with chloroform (3×300 ml.) and wash the chloroform extracts with water, dry over sodium sulfate, and filter. The chloroform filtrate is evaporated, yielding a residue which is then treated with 400 ml. of liquid ammonia. Allow the excess of ammonia to evaporate and triturate the solid residue with hexane to yield a solid, 2-nitro-4-chloro-benzene-sulfonamide, which is further triturated with water, filter, dry and recrystallize from methanol water.

(C) *2-amino-4-chloro-benzenesulfonamide.*—Add to a refluxing reaction mixture containing 4.4 g. of ammonium chloride, 18 ml. of methanol, 9 ml. of water and 3.0 g. of 2-nitro-4-chloro-benzenesulfonamide (in a portionwise fashion over a period of 1.5 hours) 4.4 g. of iron filings. Continue the resulting reflux reaction for 1.5 hours. Filter the resulting mixture and concentrate the filtrate to dryness. Triturate the resulting residue with 15 ml. of water to yield the intermediate of this portion of the example, which is filtered and recrystallized from methanol-water.

(D) *6-chloro-3-imino-3,4-dihydro - 1,2,4-benzothiadiazine-1,1-dioxide.*—Mix 3 grams of 2-amino-4-chlorobenzensulfonamide with 5.1 grams of guanidine carbonate and fuse the mixture at 180° C. for one hour. Cool the reaction mixture and dissolve it in water; neutralize with hydrochloric acid; collect the crude product by filtration and purify by crystallization from ethanol-water to yield the product of this example M.P. 339–340° C.

As is apparent to one skilled in the art, by replacing the 2,5-dichloro-nitrobenzene of Example 4 with other appropriately substituted chloro-nitrobenzenes the production of other novel 3-imino-3,4-dihydro-1,2,4-benzothiadiazines may be effected by following substantially the procedures described in Example 4.

Therefore, by replacing the 2,5-dichloro-nitrobenzene of part A of Example 4 with the compounds enumerated below in group A and by following substantially the procedures outlined in parts A, B and C of said example there are produced, respectively, the corresponding compounds enumerated below in group B. By substituting the 2-amino-4-chloro-benzenesulfonamide of part D of Example 4 with the compounds of group B and by following substantially the procedure described in part D, there are produced, respectively, the corresponding compounds enumerated below in group C.

*Group A:*

(1) 2-chloro-4-trifluoromethyl-nitrobenzene;
(2) 2-chloro-5-trifluoromethyl-nitrobenzene;
(3) 2,4-dichloro-nitrobenzene;
(4) 2-chloro-4-trifluoromethyl-5-methyl-nitrobenzene;
(5) 2,4-dichloro-5-methyl-nitrobenzene;
(6) 2,4-dichloro-3-methyl-nitrobenzene;
(7) 2-chloro-4,5-di-trifluoromethyl-nitrobenzene;
(8) 2-chloro-4-methyl-5-trifluoromethyl-nitrobenzene;
(9) 2,4-dichloro-5-trifluoromethyl-nitrobenzene;
(10) 2,4,5-trichloro-nitrobenzene;
(11) 2,5-dichloro-4-methyl-nitrobenzene;
(12) 2,5-dichloro-4-trifluoromethyl-nitrobenzene;
(13) 2,3,4-trichloro-nitrobenzene;
(14) 2,5-dichloro-3-trifluoromethyl-nitrobenzene.

*Group B*

(1) 2-amino-5-trifluoromethyl-benzenesulfonamide;
(2) 2-amino-4-trifluoromethyl-benzenesulfonamide;
(3) 2-amino-5-chloro-benzenesulfonamide;
(4) 2-amino-4-methyl-5-trifluoromethyl-benzenesulfonamide;
(5) 2-amino-4-methyl-5-chloro-benzenesulfonamide;
(6) 2-amino-5-chloro-6-methyl-benzenesulfonamide;
(7) 2-amino-4,5-di-trifluoromethyl-benzenesulfonamide;
(8) 2-amino-4-trifluoromethyl-5-methyl-benzenesulfonamide;
(9) 2-amino-4-trifluoromethyl-5-chloro-benzenesulfonamide;
(10) 2-amino-4,5-dichloro-benzenesulfonamide;
(11) 2-amino-4-chloro-5-methyl-benzenesulfonamide;
(12) 2-amino-4-chloro-5-trifluoromethyl-benzenesulfonamide;
(13) 2-amino-5,6-dichloro-benzenesulfonamide;
(14) 2-amino-4-chloro-6-trifluoromethyl-benzenesulfonamide;

*Group C*

(1) 7-trifluoromethyl-3-imino-3,4-dihydro-1,2,4-benzothiadiazine-1,1-dioxide;
(2) 6-trifluoromethyl-3-imino-3,4-dihydro-1,2,4-benzothiadiazine-1,1-dioxide;
(3) 7-chloro-3-imino-3,4-dihydro-1,2,4-benzothiadiazine-1,1-dioxide;
(4) 6-methyl-7-trifluoromethyl-3-imino-3,4-dihydro-1,2,4-benzothiadiazine-1,1-dioxide;
(5) 6-methyl-7-chloro-3-imino-3,4-dihydro-1,2,4-benzothiadiazine-1,1-dioxide;
(6) 7-chloro-8-methyl-3-imino-3,4-dihydro-1,2,4-benzothiadiazine-1,1-dioxide;
(7) 6,7-ditrifluoromethyl-3-imino-3,4-dihydro-1,2,4-benzothiadiazine-1,1-dioxide;

(8) 6-trifluoromethyl-7-methyl-3-imino-3,4-dihydro-1,2,4-benzothiadiazine-1,1-dioxide;
(9) 6-trifluoromethyl-7-chloro-3-imino-3,4-dihydro-1,2,4-benzothiadiazine-1,1-dioxide;
(10) 6,7-dichloro-3-imino-3,4-dihydro-1,2,4-benzothiadiazine-1,1-dioxide;
(11) 6-chloro-7-methyl-3-imino-3,4-dihydro-1,2,4-benzothiadiazine-1,1-dioxide;
(12) 6-chloro-7-trifluoromethyl-3-imino-3,4-dihydro-1,2,4-benzothiadiazine-1,1-dioxide;
(13) 7,8-dichloro-3-imino-3,4-dihydro-1,2,4-benzothiadiazine-1,1-dioxide;
(14) 6-chloro-8-trifluoromethyl-3-imino-3,4-dihydro-1,2,4-benzothiadiazine-1,1-dioxide.

*Example 5.—3-imino-4-methyl-6-chloro-3,4-dihydro-1,2,4-benzothiadiazine-1,1-dioxide*

Add 10 g. of 3-imino-6-chloro-3,4-dihydro-1,2,4-benzothiadiazine-1,1-dioxide and 30 g. of methyl iodide to a solution of sodium methoxide prepared by dissolving 3.5 g. of sodium metal in 125 ml. of anhydrous methanol and reflux the mixture for 16 hours. Cool and collect the product by filtration and purify by crystallization from ethonal, M.P. 269–271°.

*Example 6.—Sodium salt of 6-chloro-3 imino 3,4-dihydro-1,2,4-benzothiadiazine-1,1-dioxide*

Dissolve 6-chloro-3-imino-3,4-dihydro-1,2,4-benzothiadiazine-1,1-dioxide as described in Example 4 in alcoholic sodium hydroxide and evaporate the solution in vacuo to yield the sodium salt of 6-chloro-3-imino-3,4-dihydro-1,2,4-benzothiadiazine-1,1-dioxide.

While the above examples describe the preparation of certain illustrative compounds of this invention and certain specific dosage forms suitable for therapeutic administration, it is to be understood that the invention is not to be considered as limited to these specific reaction conditions described for the preparation of the compounds or by the specific ingredients included in the pharmaceutical preparations but is understood to embrace variations and modifications falling within the scope of the appended claims.

We claim:
1. A compound selected from the group consisting of 3 - imino-3,4-dihydro-1,2,4-benzothiadiazine-1,1-dioxides having the formulae:

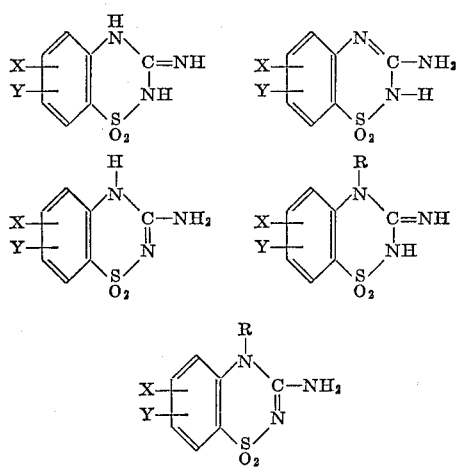

and the non toxic alkali metal salts thereof wherein R is a lower alkyl group, X is a member of the group consisting of hydrogen, trifluoromethyl, halogen and lower alkyl, and Y is a member of the group consisting of trifluoromethyl, and halogen.

2. 6 - chloro - 3-imino-3,4-dihydro-1,2,4-benzothiadiazine-1,1-dioxide.
3. 7 - chloro - 3-imino-3,4-dihydro-1,2,4-benzothiadiazine-1,1-dioxide.
4. 6,7 - dichloro - 3-imino-3,4-dihydro-1,2,4-benzothiadiazine-1,1-dioxide.
5. 4 - methyl - 6-trifluoromethyl-3-imino-3,4-dihydro-1,2,4-benzothiadiazine-1,1-dioxide.
6. 6 - chloro - 7 - trifluoromethyl-3-imino-3,4-dihydro-1,2,4-benzothiadiazine-1,1-dioxide.
7. 7 - trifluoromethyl-3-imino-3,4-dihydro-1,2,4-benzothiadiazine-1,1-dioxide.
8. 6 - methyl - 7 - bromo-3-imino-3,4-dihydro-1,2,4-benzothiadiazine-1,1-dioxide.
9. 6,7 - di - trifluoromethyl-3-imino-3,4-dihydro-1,2,4-benzothiadiazine-1,1-dioxide.
10. A method of treating hypertension in mammals which comprises administering to a mammal a pharmaceutical preparation comprising a therapeutically effective dose of a 3-imino-3,4-dihydro-1,2,4-benzothiadiazine-1,1-dioxide having the formulae:

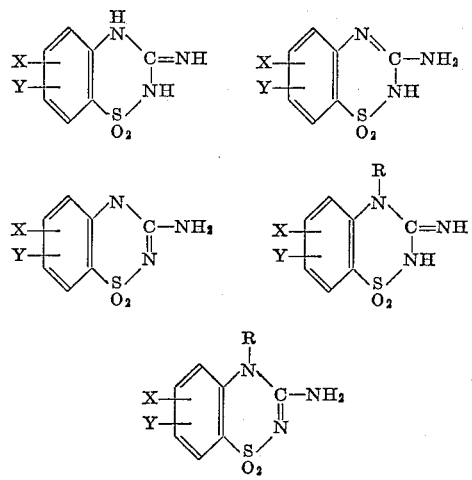

and the non toxic alkali metal salts thereof wherein R is a lower alkyl group, X is a member of the group consisting of hydrogen, trifluoromethyl, halogen and lower alkyl, and Y is a member of the group consisting of trifluoromethyl, and halogen.

11. The method of claim 10 wherein the total daily dose of the 3-imino-3,4-dihydro-1,2,4-benzothiadiazine-1,1-dioxide is in the range of 0.1–5.0 mg. per kilo of body weight.

12. 6 - trifluoromethyl - 3-imino-3,4-dihydro-1,2,4-benzothiadiazine-1,1-dioxide.

References Cited by the Examiner
FOREIGN PATENTS 847,176   9/1960   Great Britain.
36,956    3/1959   Luxembourg.

NICHOLAS S. RIZZO, *Primary Examiner.*
IRVING MARCUS, *Examiner.*